United States Patent
Lamarca et al.

(10) Patent No.: US 9,374,626 B2
(45) Date of Patent: Jun. 21, 2016

(54) USE OF DIGITAL TV BANDWIDTH FOR WEB CACHE PRE-LOADING

(71) Applicants: Anthony G. Lamarca, Seattle, WA (US); Xingang Guo, Portland, OR (US); Maynard C. Falconer, Portland, OR (US)

(72) Inventors: Anthony G. Lamarca, Seattle, WA (US); Xingang Guo, Portland, OR (US); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 13/943,855

(22) Filed: Jul. 17, 2013

(65) Prior Publication Data

US 2015/0026741 A1    Jan. 22, 2015

(51) Int. Cl.
| | |
|---|---|
| *H04N 7/173* | (2011.01) |
| *H04N 21/61* | (2011.01) |
| *H04N 21/433* | (2011.01) |
| *H04N 21/435* | (2011.01) |
| *H04N 21/835* | (2011.01) |
| *H04N 21/442* | (2011.01) |

(52) U.S. Cl.
CPC .......... *H04N 21/6175* (2013.01); *H04N 21/435* (2013.01); *H04N 21/4331* (2013.01); *H04N 21/4351* (2013.01); *H04N 21/44209* (2013.01); *H04N 21/835* (2013.01)

(58) Field of Classification Search
CPC H04N 21/6175; H04N 21/435; H04N 21/835
USPC ......................................... 725/109, 110, 112
See application file for complete search history.

(56) References Cited

U.S. PATENT DOCUMENTS

| | | | |
|---|---|---|---|
| 2005/0045712 A1* | 3/2005 | Paul et al. ...................... 235/375 |
| 2006/0130114 A1* | 6/2006 | Kwon et al. ................... 725/118 |
| 2010/0011089 A1 | 1/2010 | Rivers et al. |
| 2012/0222065 A1 | 8/2012 | Prins et al. |
| 2013/0019159 A1 | 1/2013 | Civelli et al. |
| 2014/0095886 A1* | 4/2014 | Futral ................... G06F 21/572 713/187 |

FOREIGN PATENT DOCUMENTS

| | | | |
|---|---|---|---|
| EP | 2369837 | * | 12/1999 |
| EP | 2 369 837 A2 | | 9/2011 |
| JP | 2004-005447 A | | 1/2004 |
| WO | 2015/009695 A1 | | 1/2015 |

OTHER PUBLICATIONS

International Search Report and Written Opinion received for PCT Patent Application No. PCT/US2014/046648, mailed on Nov. 5, 2014, 11 pages.
International Preliminary Report on Patentability received for PCT Patent Application No. PCT/US2014/046648, mailed on Jan. 29, 2016.

* cited by examiner

*Primary Examiner* — Pankaj Kumar
*Assistant Examiner* — Sahar Baig
(74) *Attorney, Agent, or Firm* — Grossman, Tucker, Perreault & Pfleger, PLLC

(57) ABSTRACT

Generally, this disclosure provides systems, devices, methods and computer readable media for the use of digital TV (DTV) bandwidth for web cache pre-loading. A system may include a receiver module configured to receive a digital television (DTV) signal. The system may also include a data extraction module configured to extract the web cache data from the DTV signal, wherein the web cache data is encoded within the spectral bandwidth of the DTV signal. The system may further include a network interface configured to transmit the extracted web cache data to a device that includes a web cache pre-loading service.

15 Claims, 6 Drawing Sheets

USE OF DIGITAL TV BANDWIDTH FOR WEB CACHE PRE-LOADING

FIELD

The present disclosure relates to web cache pre-loading, and more particularly, to the use of digital TV bandwidth for web cache pre-loading.

BACKGROUND

Broadband internet access speeds, for example data download rates, may vary significantly between different user premises depending on geographic location and the available technology offered by the service provider. Some existing broadband technologies include, for example, cable, fiber and digital subscriber line (DSL) connections. For many users, however, the data rates with even the highest bandwidth technologies are insufficient to meet the demands of increasingly rich internet experiences such as, for example, high definition video. This can result in a reduced quality user experience.

One existing solution to this problem is to provide lower bandwidth versions of the internet content. Lower bandwidth versions are typically associated, however, with decreased resolution. While these versions may download in a shorter period of time, they do not allow the user to experience the internet content in the format or resolution that was originally intended. Thus, the quality of the user experience remains diminished.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for the use of digital TV (DTV) bandwidth for web cache pre-loading. A DTV broadcasting facility may download web data or web content from the internet. The downloads may be limited to content that is predicted to be popular with users of devices such as, for example, laptops, tablets and smartphones that have web browsers or streaming video servers. The downloads may also include revenue generating content, such as, for example, fee based advertisements. The web content may then be encoded into data blocks that can be combined with the television content that the DTV broadcaster generates. The combined television content and web content may then be transmitted as a DTV signal. Since DTV signals typically use variable bit rate (VBR) encoding techniques, there may be unused bandwidth available to carry the web content, for example during times when the television content is less dynamic.

DTV receivers, located for example in user's homes, may be configured to extract the television content from the DTV signal, to be displayed on a television. The DTV receivers may also be configured to extract the web content from the DTV signal and to transmit that web content to the various user devices, for example over a local area network (LAN). The devices may be configured with a cache pre-loading service that receives the web content over the LAN and selectively loads the caches of the web browsers and/or streaming video servers with the web content so that the data is available when requested at a future time without the delays associated with internet downloads.

Figure 1:
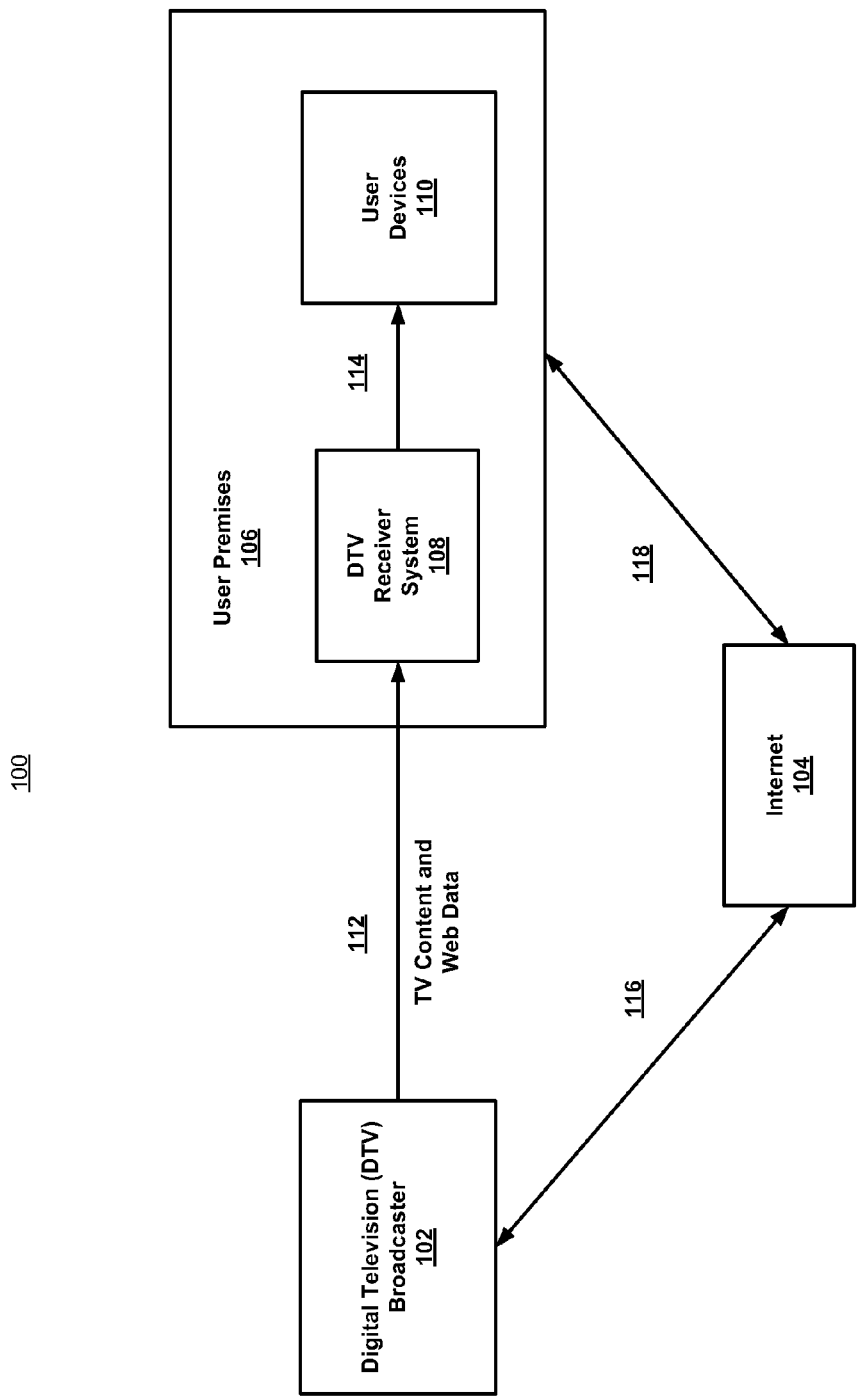
FIG. 1 illustrates a top level system diagram of one example embodiment consistent with the present disclosure.

FIG. 1 illustrates a top level system diagram 100 of one example embodiment consistent with the present disclosure. A system is shown to include a DTV broadcasting facility 102 that transmits television content and web data 112 to a number of user premises 106 which may include homes, businesses or any location where users may employ a television as well as a device such as a laptop, tablet or smartphone 110. Both the DTV broadcaster 102 and the user premises 106 may have access to the internet 104, although the respective internet connections 116 and 118 may provide different data rates. The internet connection data rate to the broadcasting facility 116 may typically be higher than the data rate to the user premises 118, although this is not a requirement.

User premises 106 is also shown to include a DTV receiver system 108 that may be configured to extract and separate the television content and the web content from the received DTV signal as will be explained in greater detail below. The web content may then be provided to the devices 110 for cache pre-loading. Static web content in the form of potentially large data files (e.g., pre-recorded videos, music, or games), once pre-loaded into a cache may be played and replayed in a web browser or video stream sever with virtually no delay. The static content may also be combined with dynamic content that is downloaded through the device internet connection while still providing an improved user experience.

Figure 2:
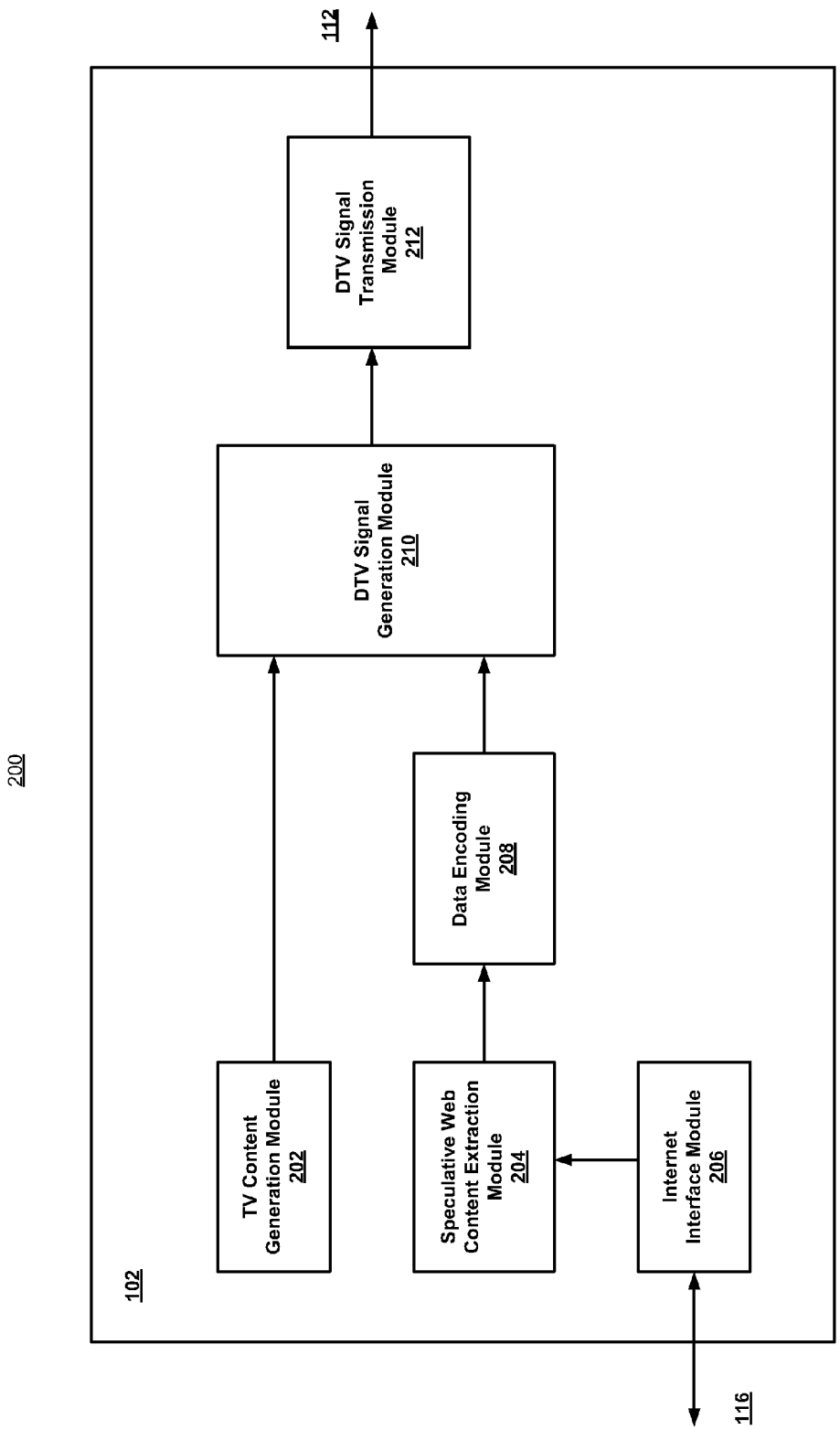
FIG. 2 illustrates a block diagram of one example embodiment consistent with the present disclosure.

FIG. 2 illustrates a block diagram 200 of one example embodiment consistent with the present disclosure. The DTV broadcasting facility 102 is shown to include a TV content generation module 202, an internet interface module 206, a speculative web content extraction module 204, a data encoding module 208, a DTV signal generation module 210 and a DTV signal transmission module 212.

TV content generation module 202 may be configured to generate a television content signal suitable for broadcasting by the DTV broadcast facility 102. Television content may include movies, shows, news, sports, commercials, etc. Internet interface module 206 may be configured to enable web content download over internet connection 116. The web content may be provided to speculative web content extraction module 204 which is configured to extract selected portions of the web content based on speculation or prediction of the value of that web content for cache pre-loading purposes according to various usage criteria as will be described below.

The selected web content may then be encoded by a data encoding module 208 as a data signal which may be combined with the television content signal generated by module 202. This data signal may advantageously occupy some or all of the otherwise unused bandwidth in the DTV signal. Bandwidth sharing may be possible as a result of the variable bit rate encoding used in DTV signals, where slower bit rates are employed for the less dynamic segments of the television content, freeing up bandwidth during those times. In some embodiments, the data signal may be included in a metadata channel associated with the DTV signal, allowing the data signal to "piggyback" on the DTV signal without requiring modification of any of the protocols or formats associated with the DTV signal. In some embodiments, the metadata channel may be encoded as a Digital Storage Media Command and Control (DSM-CC) signal that shares a portion of the spectral bandwidth of the DTV signal.

Data encoding module 208 may also be configured to format the web content into data blocks and to generate a probabilistic content verification signature to be associated with the data blocks. The content verification signature may be employed to allow the receiver of the data to efficiently determine that duplicate web content is not downloaded, without requiring that every byte of data in the block be checked or compared against previously obtained data. The content verification signature may be generated using a hashing (or encrypted hashing) algorithm configured to generate a hash value based on a calculation involving the bytes of data to be transmitted (or any suitable subset of the data, such as blocks or files, etc.). The hash value has a high probability, for example greater than 99 percent, of uniquely identifying a block of data. In other words, two different sets of data are unlikely (for example, probability less than 1 percent) to produce the same hash value. Thus the hash value, or signature, once calculated, can be associated with the web content enabling receivers of the web content to simply compare the signature to a list of previously received signatures to determine and avoid duplicative downloads.

In some embodiments, the content verification signature may be based on a Merkle-Damgard 5 (MD5) hash signature or a Secure Hash Algorithm 1 (SHA-1) hash signature.

DTV signal generation module 210 may be configured to combine the television content and the encoded web content and generate a DTV signal based on the combination. In some embodiments, the DTV signal may comply with the Advanced Television Systems Committee (ATSC) signal standard or with any other suitable DTV signal standards including Digital Video Broadcasting (DVB-T), Integrated Services Digital Broadcasting-Terrestrial (ISDB-T) and Digital Terrestrial Multimedia Broadcast (DTMB) standards. DTV signal transmission module 212 may be configured to transmit the DTV signal so that it may be received at user premises 106.

Many homes receive continuous DTV signal transmissions. Depending on the technology, DTV channels may carry between 2 and 10 Mb/sec of data. Much of the channel bandwidth may be unused because programming is not necessarily available on all channels at all times and the programming that is transmitted is VBR encoded. For example, when a television content channel is encoding rapidly changing scenes, more bandwidth is consumed, but when slow motion or relatively static scenes are being encoded, less bandwidth is consumed.

Figure 3:
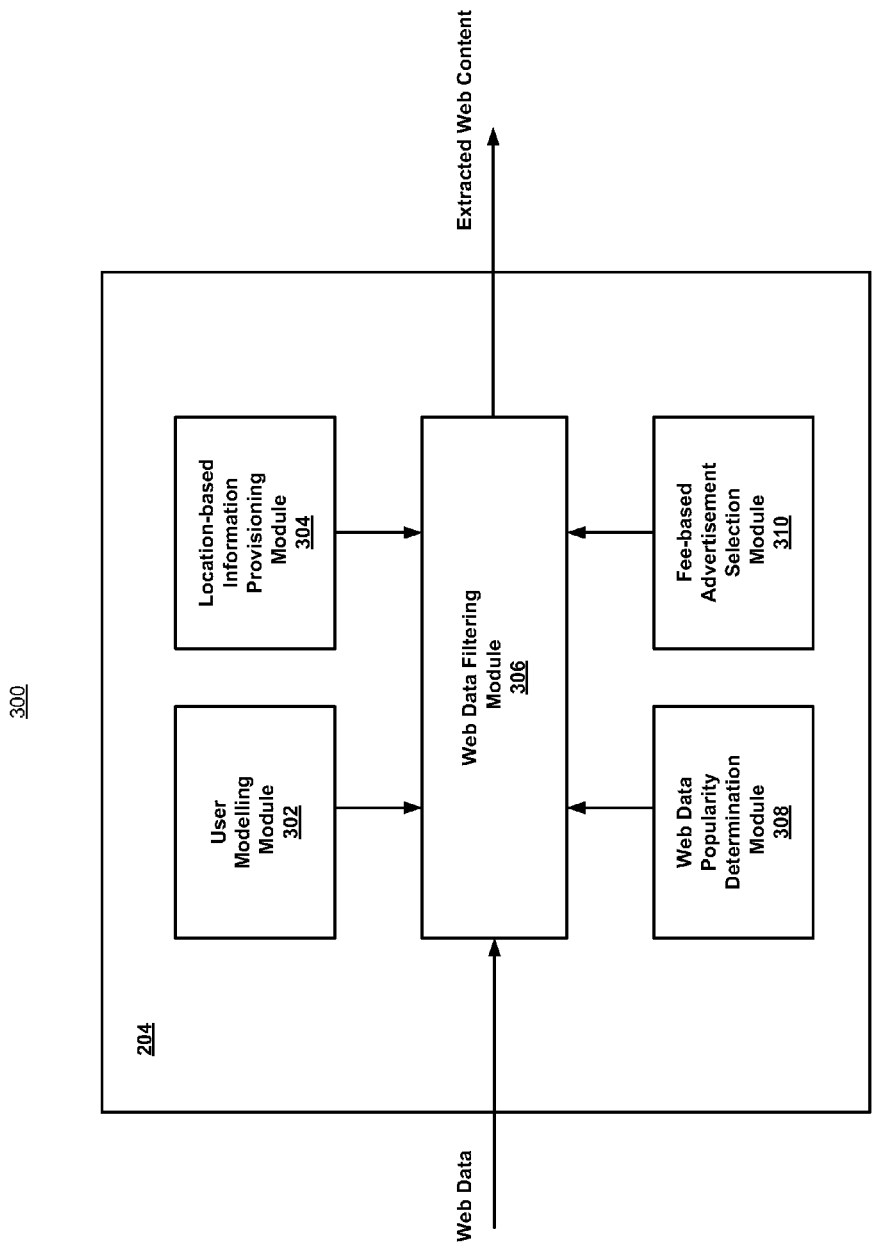
FIG. 3 illustrates a block diagram of another example embodiment consistent with the present disclosure.

FIG. 3 illustrates a block diagram 300 of another example embodiment consistent with the present disclosure. Speculative web content extraction module 204 is shown to further include a web data filtering module 306, a user modeling module 302, a location-based information provisioning module 304, a web data popularity determination module 308 and a fee-based advertisement selection module 310.

Web data filtering module 306 may be configured to select and extract (e.g., filter) portions of the web content based on a number of usage criteria. For example, in some embodiments, user modeling module 302 may be configured to generate user preference information for use in the process of predicting the relative value of web content with respect to suitability for cache pre-loading. In some embodiments, location-based information provisioning module 304 may be configured to provide location-based preference information also for use in the process of predicting the relative value of web content. The location may be associated, for example, with the geographic area over which the DTV signal is broadcast. For example, different television markets may be associated with different preferences in web browsing.

In some embodiments, web data popularity determination module 308 may be configured to determine the relative popularity of web content through any suitable mechanism, such as, for example, published data and/or polling results that may be available. In some embodiments, fee-based advertisement selection module 310 may be configured to select web content associated with advertising for which the broadcaster, or some other entity, has collected a fee. Advertisers may provide this revenue source to broadcasters so that users are provided with a higher quality experience when receiving the advertiser's message which results in a more effective advertisement campaign and improved sales of the advertiser's products and services.

Figure 4:
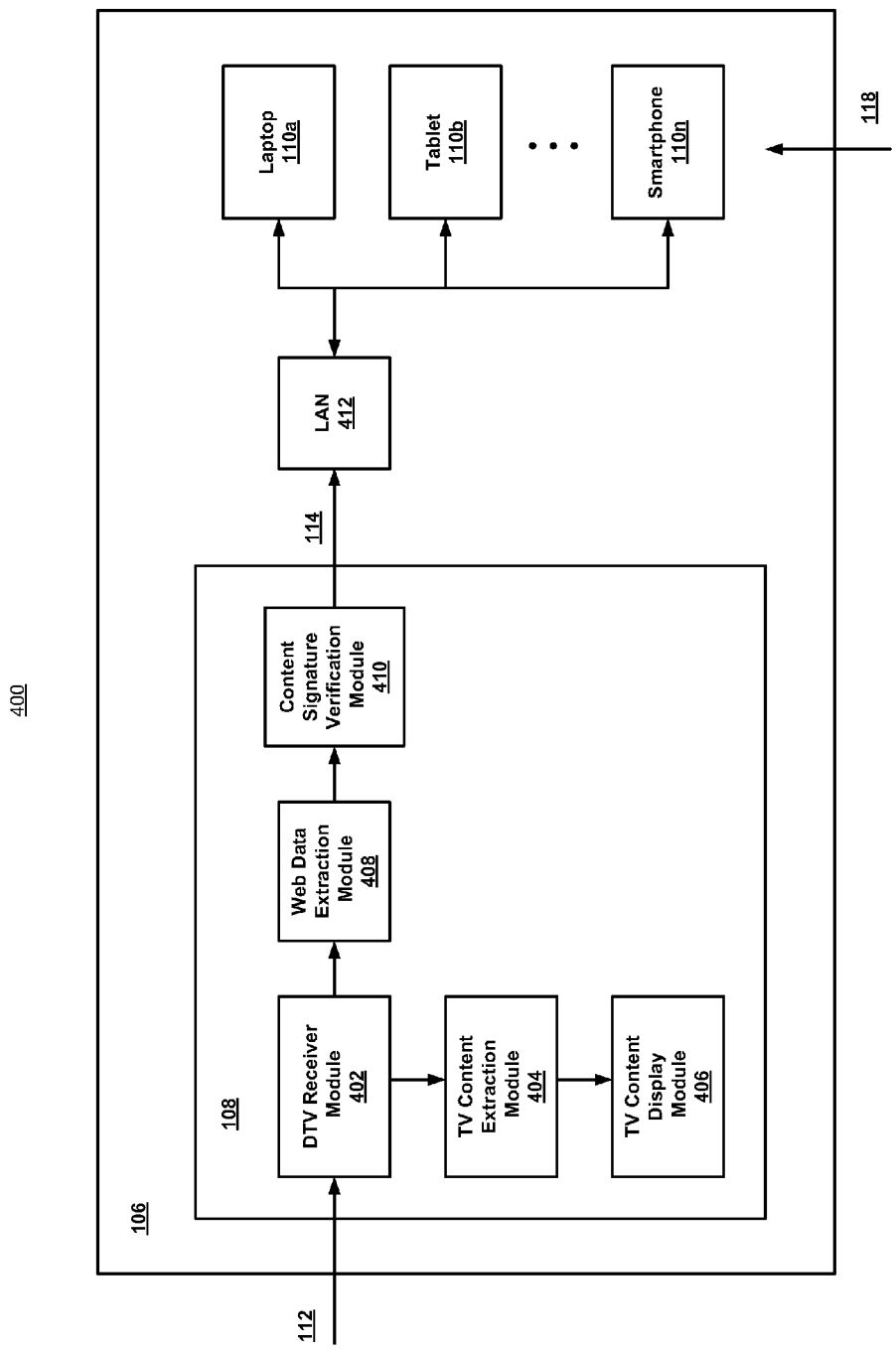
FIG. 4 illustrates a block diagram of another example embodiment consistent with the present disclosure.

FIG. 4 illustrates a block diagram 400 of another example embodiment consistent with the present disclosure. User premises 106 is shown to include a LAN 412 connecting DTV receiver system 108 and user devices 110a, 110b, . . . 110n. DTV receiver system 108 is shown to further include DTV receiver module 402, TV content extraction module 404, TV content display module 406, web data extraction module 408 and content signature verification module 410.

DTV receiver module 402 may be configured to receive a DTV signal as transmitted by DTV broadcasting facility 102. In some embodiments, the DTV signal may comply with the ATSC signal standard or with any other suitable DTV signal standards including the DVB-T, ISDB-T, and DTMB standards. TV content extraction module 404 may be configured to extract the television content from the received DTV signal and provide that television content to TV content display module 406, which enables a user at premises 106 to view the broadcast television content.

Web data extraction module 408 may be configured to extract the web content from the received DTV signal. In some embodiments, the web content may be included in a metadata channel embedded in the DTV signal. The web content may be encoded as a DSM-CC signal occupying a portion of the spectral bandwidth of the DTV signal or it may be encoded using any other convenient scheme. The web content may be suitable for web cache pre-loading. Content signature verification module 410 may be configured to verify the content of data blocks of the extracted web content (e.g., web cache data). The verification may be based on an MD5 hash signature, or other probabilistic content signature schemes, and may be used to avoid cache pre-loading of duplicate web content.

The extracted web content may be provided to any of devices 110, for example through a wired or wireless LAN 412. The devices may include any number of laptops 110a, tablets 110b and/or smartphones 110n or other suitable devices which may employ web browsers or streaming video servers including portable media players (i.e., MP3 players) or digital augmented reality (AR) or virtual reality (VR) eyeglasses.

The DTV receiver module 402 may be configured to download web content and provide cache data to devices regardless of whether the user is watching the television content. For example web content may be obtained continuously, for example 24 hours a day or during any time period that the user may specify. More bandwidth may be available in the DTV signal during overnight time periods when less television content programming is provided which may enable yet more efficient operation of the system.

Figure 5:
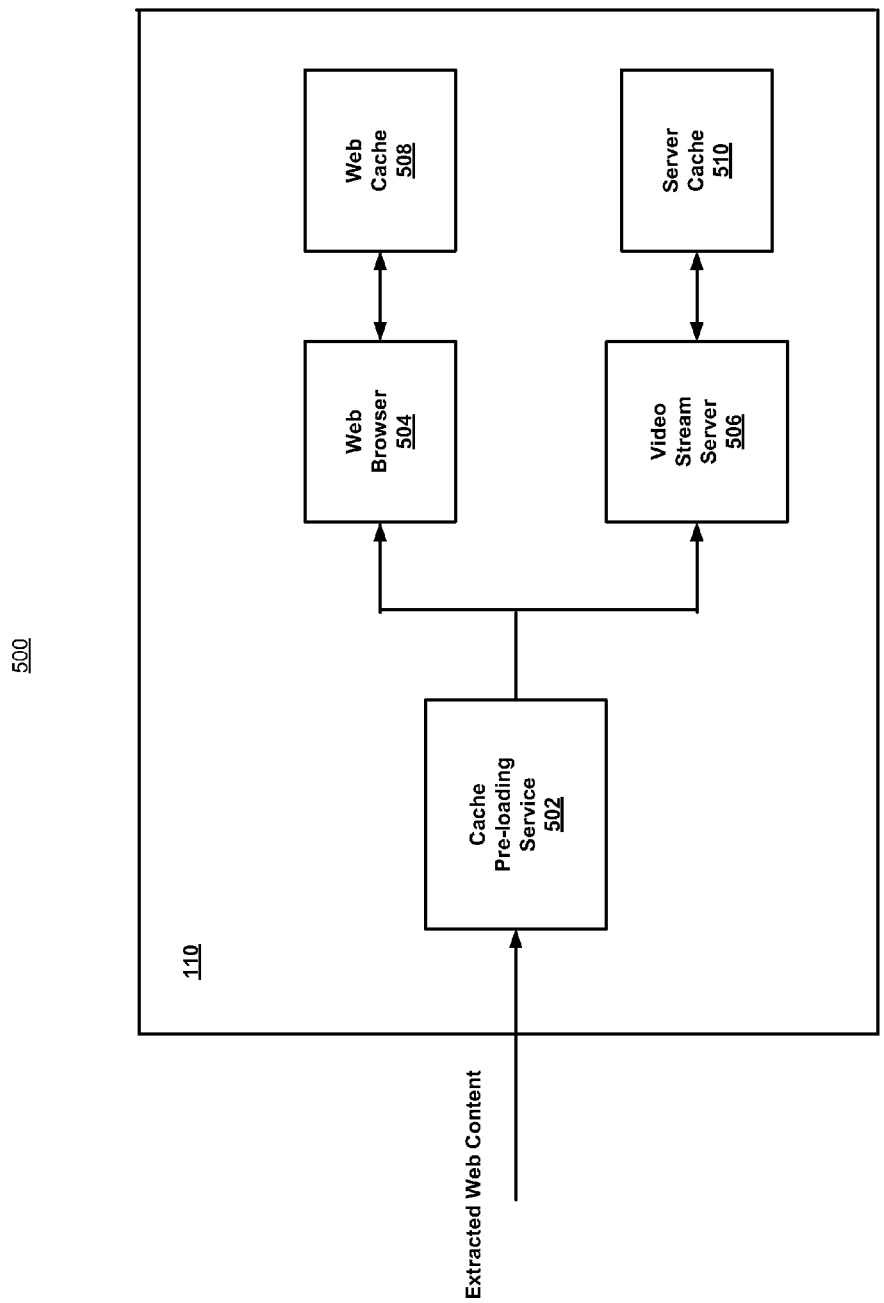
FIG. 5 illustrates a block diagram of another example embodiment consistent with the present disclosure.

FIG. 5 illustrates a block diagram 500 of another example embodiment consistent with the present disclosure. User device 110 is shown to further include cache pre-loading service 502, web browser 504, web cache 508, video streaming server 506, and server cache 510. Cache pre-loading service 502 may be configured to receive web content from the DTV receiver system 108, for example through LAN 412, and to pre-load the web content into caches 508, 510 associated with web browser 504 and video stream server 506, respectively. In some embodiments, the cache pre-loading service 502 may write the web content data to a region of memory of the device known to include some portion of the caches 508, 510. The cache pre-loading service 502 may also be configured to limit the size of the pre-loads (e.g., cache memory writes) to a pre-determined threshold.

The web browser 504 may be configured to present web content to a user of the device where the presented web content may be a mixture of content from the cache 508 and content received from internet connection 118.

The video stream server may be configured to present video content to a user of the device where the presented video content may be a mixture of content from the cache 510 and content received from internet connection 118.

Figure 6:
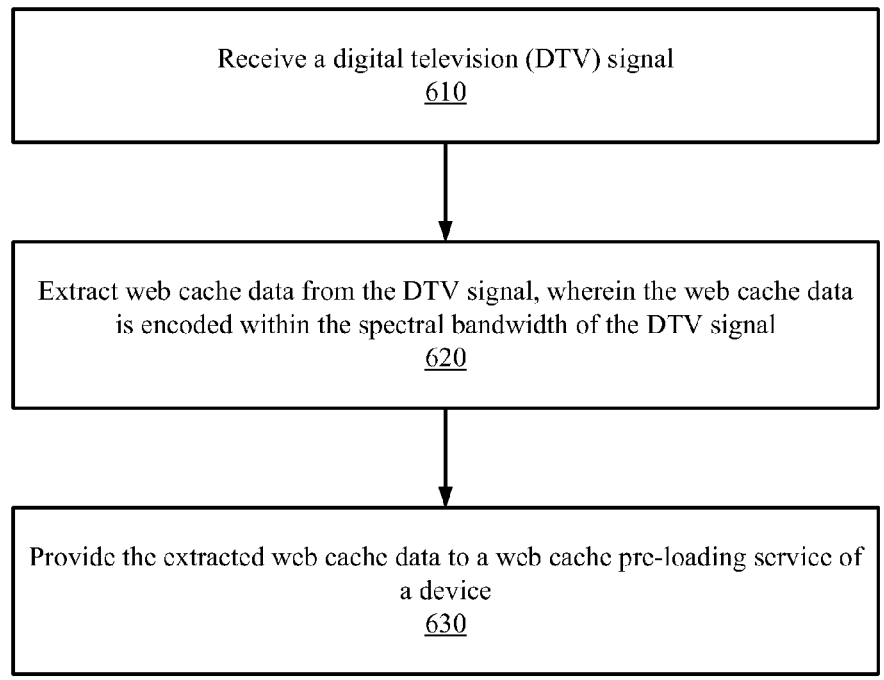
FIG. 6 illustrates a flowchart of operations of another example embodiment consistent with the present disclosure.

FIG. 6 illustrates a flowchart of operations 600 of another example embodiment consistent with the present disclosure. At operation 610, a DTV signal is received. The DTV signal may be an ATSC the signal or any other suitable DTV signal format including the DVB-T, ISDB-T, and DTMB standards. At operation 620, web cache data is extracted from the DTV signal. The web cache data may be encoded within the spectral bandwidth of the DTV signal. The web cache data may be encoded, for example, as a metadata channel or as a DSM-CC signal. The contents of data blocks of the encoded signal may be verified based on a probabilistic content hash signature. At operation 630, the extracted web cache data is provided to a web cache pre-loading service of a device.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for the use of DTV bandwidth for web cache pre-loading. The following examples pertain to further embodiments.

According to one aspect there is provided a system for receiving web cache data. The system may include a receiver module configured to receive a DTV signal. The system of this example may also include a data extraction module configured to extract the web cache data from the DTV signal, and the web cache data is encoded within the spectral bandwidth of the DTV signal. The system of this example may further include a network interface configured to transmit the extracted web cache data to a device, the device including a web cache pre-loading service.

Another example system includes the forgoing components and further includes a content signature verification module configured to verify the content of data blocks of the extracted web cache data, the verification based on an encrypted hash signature.

Another example system includes the forgoing components and the web cache data is encoded as a metadata channel within the spectral bandwidth of the DTV signal.

Another example system includes the forgoing components and the web cache data is encoded as a DSM-CC signal within the spectral bandwidth of the DTV signal.

Another example system includes the forgoing components and further includes a television content extraction module configured to extract television content from the DTV signal and a television content display module configured to display the extracted television content.

Another example system includes the forgoing components and the DTV signal is an ATSC signal, a DVB-T signal, an ISDB-T signal or a DTMB signal.

According to another aspect there is provided a system to provide web cache data. The system may include a speculative web content extraction module configured to select and extract web content from an internet interface, the web content for use as the web cache data. The system of this example may also include a television content generation module configured to generate a television content signal. The system of this example may further include a data encoding module configured to encode the extracted web content to be combined with the television content signal. The system of this example may further include a DTV signal generation module configured to generate a DTV signal including the television content signal and the encoded extracted web content.

Another example system includes the forgoing components and the speculative web content extraction module includes a web data filtering module configured to select the web content based on a usage criteria.

Another example system includes the forgoing components and the speculative web content extraction module further includes a user modeling module configured to generate user preference information, and the usage criteria includes the user preference information.

Another example system includes the forgoing components and the speculative web content extraction module further includes a location-based information module configured to provide location-based preference information, and the usage criteria includes the location-based preference information.

Another example system includes the forgoing components and the speculative web content extraction module further includes a web data popularity determination module configured to generate popularity information associated with the web data, and the usage criteria includes the popularity information.

Another example system includes the forgoing components and the speculative web content extraction module further includes a fee-based advertisement selection module configured to enable web data filtering module to select web content associated with fee-based advertising.

Another example system includes the forgoing components and the data encoding module is further configured to generate a content verification signature associated with data blocks of the extracted web content, the content verification signature based on an encrypted hash signature.

Another example system includes the forgoing components and the data encoding module is further configured to encode the extracted web content as a metadata channel within the spectral bandwidth of the DTV signal.

Another example system includes the forgoing components and the metadata channel is encoded as a DSM-CC signal.

Another example system includes the forgoing components and further includes a transmitter module configured to transmit the DTV signal, and the DTV signal is an ATSC signal, a DVB-T signal, an ISDB-T signal or a DTMB signal.

According to another aspect there is provided a device. The device may include a web browser configured to present web content to a user of the device. The device of this example may also include a cache pre-loading service configured to receive web content from a DTV receiver system through a network interface and to pre-load the web content to a web cache associated with the web browser.

Another example device includes the forgoing components and further includes a video stream server configured to present video content to a user of the device; and the cache pre-loading service is further configured to pre-load the web content to a server cache associated with the video stream server.

Another example device includes the forgoing components and the cache pre-loading service is further configured to write the web content to a region of memory of the device, and the web cache includes the region of memory.

Another example device includes the forgoing components and the cache pre-loading service is further configured to limit the size of the write to the region of memory to a pre-determined threshold size.

Another example device includes the forgoing components and the device is a smartphone, a laptop computing device, a tablet or AR/VR glasses.

According to another aspect there is provided a method for receiving web cache data. The method may include receiving a DTV signal. The method of this example may also include extracting the web cache data from the DTV signal, and the web cache data is encoded within the spectral bandwidth of the DTV signal. The method of this example may further include providing the extracted web cache data to a web cache pre-loading service of a device.

Another example method includes the forgoing operations and further includes verifying the content of data blocks of the extracted web cache data, the verification based on an encrypted hash signature.

Another example method includes the forgoing operations and further includes encoding the web cache data as a metadata channel within the spectral bandwidth of the DTV signal.

Another example method includes the forgoing operations and further includes encoding the web cache data as a DSM-CC signal within the spectral bandwidth of the DTV signal.

Another example method includes the forgoing operations and further includes extracting television content from the DTV signal and displaying the extracted television content.

Another example method includes the forgoing operations and the DTV signal is an ATSC signal, a DVB-T signal, an ISDB-T signal or a DTMB signal.

According to another aspect there is provided a system for receiving web cache data. The system may include a means for receiving a DTV signal. The system of this example may also include a means for extracting the web cache data from the DTV signal, and the web cache data is encoded within the spectral bandwidth of the DTV signal. The system of this example may further include a means for providing the extracted web cache data to a web cache pre-loading service of a device.

Another example system includes the forgoing components and further includes a means for verifying the content of data blocks of the extracted web cache data, the verification based on an encrypted hash signature.

Another example system includes the forgoing components and further includes means for encoding the web cache data as a metadata channel within the spectral bandwidth of the DTV signal.

Another example system includes the forgoing components and further includes means for encoding the web cache data as a DSM-CC signal within the spectral bandwidth of the DTV signal.

Another example system includes the forgoing components and further includes means for extracting television content from the DTV signal and means for displaying the extracted television content.

Another example system includes the forgoing components and the DTV signal is an ATSC signal, a DVB-T signal, an ISDB-T signal or a DTMB signal.

According to another aspect there is provided a method for pre-loading web cache data. The method may include configuring a web browser to present web content to a user. The method of this example may also include receiving, by a cache pre-loading service, web content from a DTV receiver system through a network interface. The method of this example may further include pre-loading the web content to a web cache associated with the web browser.

Another example method includes the forgoing operations and further includes configuring a video stream server to present video content to a user; and pre-loading the web content to a server cache associated with the video stream server.

Another example method includes the forgoing operations and further includes writing, by the cache pre-loading service, the web content to a region of memory associated with the web cache.

Another example method includes the forgoing operations and further includes limiting the size of the write to the region of memory to a pre-determined threshold size.

According to another aspect there is provided a system for pre-loading web cache data. The system may include a means for configuring a web browser to present web content to a user. The system of this example may also include a means for receiving, by a cache pre-loading service, web content from a DTV receiver system through a network interface. The system of this example may further include a means for pre-loading the web content to a web cache associated with the web browser.

Another example system includes the forgoing components and further includes a means for configuring a video stream server to present video content to a user; and pre-loading the web content to a server cache associated with the video stream server.

Another example system includes the forgoing components and further includes a means for writing, by the cache pre-loading service, the web content to a region of memory associated with the web cache.

Another example system includes the forgoing components and further includes a means for limiting the size of the write to the region of memory to a pre-determined threshold size.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for receiving web cache data, said system comprising:
   a receiver configured to receive a digital television (DTV) signal;
   a data extraction circuit that, in operation, extracts said web cache data from said DTV signal, wherein said web cache data is encoded within the spectral bandwidth of said DTV signal;
   a content signature verification circuit that, in operation, verifies the content of data blocks of said extracted web cache data, said verification based on an encrypted hash signature, said encrypted hash signature configured to identify the content of data blocks of said extracted web cache data; and
   a network interface configured to transmit said extracted web cache data to a device comprising a web cache pre-loading service;
   wherein said web cache data is downloaded based on a comparison of said encrypted hash signature with a list of previously received signatures.

2. The system of claim 1, wherein said web cache data is encoded as a metadata channel within said spectral bandwidth of said DTV signal.

3. The system of claim 1, wherein said web cache data is encoded as a Digital Storage Media Command and Control (DSM-CC) signal within said spectral bandwidth of said DTV signal.

4. The system of claim 1, further comprising a television content extraction circuit that, in operation, extracts television content from said DTV signal and a television content display circuit that, in operation, displays said extracted television content.

5. The system of claim 1, wherein said DTV signal is an Advanced Television Systems Committee (ATSC) signal, a Digital Video Broadcasting (DVB-T) signal, an Integrated Services Digital Broadcasting-Terrestrial (ISDB-T) signal or a Digital Terrestrial Multimedia Broadcast (DTMB) signal.

6. A device comprising:
   at least one circuit; and
   at least one storage device communicably coupled to the at least one circuit, the at least one storage device including machine-readable instructions that, when executed by the at least one circuit, cause the at least one circuit to;
   cause a display of a web browser on a display device communicably coupled to the at least one circuit, the display device to present web content to a user of said device;
   receive, via a cache pre-loading service, web content extracted a digital television (DTC) signal encoded with said web cache data by a DTV receiver system through a network interface; and
   compare, via said cache pre-loading service, an encrypted hash signature identifying the content of data blocks of said extracted web cache data with a list of previously received signatures to determine whether to download said web cache data and to pre-load said web content to a web cache associated with said web browser.

7. The device of claim 6, further comprising a video stream server configured to present video content to a user of said device; and wherein said cache pre-loading service is further configured to pre-load said web content to a server cache associated with said video stream server.

8. The device of claim 6, wherein the machine-readable instructions further caused the at least one circuit to:
   write, via said cache pre-loading service, said web content to a region of memory of said device, wherein said web cache comprises said region of memory.

9. The device of claim 8, wherein the machine-readable instructions further cause the at least one circuit to:
   limit, via said cache pre-loading service, the size of said write to said region of memory to a pre-determined threshold size.

10. The device of claim 6, wherein said device is a smartphone, a laptop computing device, a tablet or augmented/virtual reality (AR/VR) glasses.

11. One or more non-transitory computer-readable storage memories having instructions stored thereon which when executed by a processor result in the following operations for receiving web cache data, said operations comprising:
    receiving a digital television (DTV) signal;
    extracting said web cache data from said DTV signal, wherein said web cache data is encoded within the spectral bandwidth of said DTV signal;
    verifying the content of data blocks of said extracted web cache data, said verification based on an encrypted hash signature, said encrypted hash signature configured to identify the content of data blocks of said extracted web cache data; and providing said extracted web cache data to a web cache pre-loading service of a device;
wherein said web cache data is downloaded based on a comparison of said encrypted hash signature with a list of previously received signatures.

12. The one or more non-transitory computer-readable storage memories of claim 11, further comprising the operations of encoding said web cache data as a metadata channel within said spectral bandwidth of said DTV signal.

13. The one or more non-transitory computer-readable storage memories of claim 11, further comprising the operations of encoding said web cache data as a Digital Storage Media Command and Control (DSM-CC) signal within said spectral bandwidth of said DTV signal.

14. The one or more non-transitory computer-readable storage memories of claim 11, further comprising the operations of extracting television content from said DTV signal and displaying said extracted television content.

15. The one or more non-transitory computer-readable storage memories of claim 11, wherein said DTV signal is an Advanced Television Systems Committee (ATSC) signal, a Digital Video Broadcasting (DVB-T) signal, an Integrated Services Digital Broadcasting-Terrestrial (ISDB-T) signal or a Digital Terrestrial Multimedia Broadcast (DTMB) signal.

* * * * *